US006886025B1

United States Patent
Britton

(10) Patent No.: US 6,886,025 B1
(45) Date of Patent: *Apr. 26, 2005

(54) METHOD OF DELIVERING FORMATTED DOCUMENTS OVER A COMMUNICATIONS NETWORK

(75) Inventor: Larry W. Britton, Troy, OH (US)

(73) Assignee: The Standard Register Company, Dayton, OH (US)

(*) Notice: Subject to any disclaimer, the term of this patent is extended or adjusted under 35 U.S.C. 154(b) by 34 days.

This patent is subject to a terminal disclaimer.

(21) Appl. No.: 10/443,411

(22) Filed: May 22, 2003

Related U.S. Application Data

(63) Continuation of application No. 09/361,506, filed on Jul. 27, 1999, now Pat. No. 6,591,289.

(51) Int. Cl.[7] .............................................. G06F 15/16
(52) U.S. Cl. ...................... 709/201; 709/202; 709/203; 345/744; 707/10; 707/101; 707/102; 707/200
(58) Field of Search ................................ 709/201, 202, 709/203, 218; 345/744; 707/4, 7, 9, 10, 101, 102, 200; 715/517

(56) References Cited

U.S. PATENT DOCUMENTS

| | | |
|---|---|---|
| 5,502,637 A | 3/1996 | Beaulieu et al. |
| 5,737,599 A | 4/1998 | Rowe et al. |
| 5,745,899 A | 4/1998 | Burrows |
| 5,745,900 A | 4/1998 | Burrows |
| 5,761,656 A | 6/1998 | Ben-Shachar |
| 5,765,168 A | 6/1998 | Burrows |
| 5,781,785 A | 7/1998 | Rowe et al. |
| 5,790,790 A | 8/1998 | Smith et al. |
| 5,793,966 A | 8/1998 | Amstein et al. |
| 5,797,008 A | 8/1998 | Burrows |
| 5,802,518 A | 9/1998 | Karaev et al. |
| 5,809,502 A | 9/1998 | Burrows |
| 5,835,712 A | 11/1998 | DuFresne |
| 5,864,871 A | 1/1999 | Kitain et al. |
| 5,940,843 A | 8/1999 | Zucknovich et al. |
| 5,987,480 A | 11/1999 | Donohue et al. |
| 5,999,941 A | 12/1999 | Andersen |
| 6,199,099 B1 | 3/2001 | Gershman et al. |
| 6,263,352 B1 | 7/2001 | Cohen |
| 6,668,354 B1 * | 12/2003 | Chen et al. .................. 715/517 |
| 6,701,352 B1 * | 3/2004 | Gardner et al. ............. 709/218 |

* cited by examiner

Primary Examiner—Jack Harvey
Assistant Examiner—Hai V. Nguyen
(74) Attorney, Agent, or Firm—Dinsmore & Shohl LLP

(57) ABSTRACT

A method of delivering a formatted document over a communications network, providing a client computer connected to the network and providing a server computer connected to the network such that the client computer is in data communication with the server computer. The client computer includes a browser program operating thereon and the server computer is provided with an information server program operating thereon. A template file is provided in data communication with the information server program of the server computer and includes a programming script, upon initiation of which the document is created having information of a pre-selected category arranged thereon according to a pre-determined layout thereof. The information is received from a data source and arranged on the document according to the pre-determined layout. The document is then formatted with the information arranged thereon according to the pre-determined pattern in a pre-selected file format and delivered to the client computer via the network.

37 Claims, 5 Drawing Sheets

METHOD OF DELIVERING FORMATTED DOCUMENTS OVER A COMMUNICATIONS NETWORK

CROSS-REFERENCE TO RELATED APPLICATION

This is a continuation application of application Ser. No. 09/361,506 filed on Jul. 27, 1999 entitled METHOD OF DELIVERING FORMATTED DOCUMENTS OVER A COMMUNICATIONS NETWORK, now U.S. Pat. No. 6,591,289.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

The present invention relates to methods of delivering formatted electronic documents over a communications network, such as the internet, and more particularly, to a method of delivering a formatted electronic document over a communications network, wherein the document is created upon request and immediately converted into a pre-determined file format prior to delivery.

2. Description of the Related Art

With the increasingly wide-spread use of on-line ordering systems, vendors and their customers desire to use such ordering systems both to allow customers to submit orders electronically and also to provide the customer with certain features separate from, but related to, the customer's ordering of goods. For example, a vendor of printed products, such as business forms, pre-printed labels or the like, may connect a designated web server computer to a quasi-public communications network, such as the internet, and install an ordering system thereon. The vendor's web server computer, which resides at an addressable location on the network, such as, for example, using the conventional TCP/IP network protocol and uniform resource locator ("URL") addressing techniques, is accessible by the vendor's customers, who may connect to the network (and therefore, to the vendor's web server computer) using a client computer having a browser program installed locally thereon and adapted to communicate to the vendor's web server computer using, for example, the aforementioned TCP/IP network protocol and URL addressing techniques.

Using the browser program as an interface to the vendor's ordering system, the customer may submit a request for the purpose of, for example, ordering a pre-determined quantity of business forms. The customer may also indicate a preferred method of paying for the order and may even further designate a location to which the order should be shipped when complete. Information relating to the customer's order typically is stored in a database, which resides either on the vendor's web server computer or on another mainframe database server computer connected to, and in data communication with, the vendor's web server computer.

Typically, the customer will have previously established an account with the vendor to facilitate the ordering process. Information relating to the customer's orders, then, may be stored in the database and accessed by the vendor, for example, to track the customer's order activity with the vendor. That is, the ordering system (in combination with the database accessible to the ordering system) allows the vendor to determine information such as the volume of items sold to the customer in the past, the revenue obtained from such sales, and the frequency with which the customer orders any particular item or any particular group of items, to name just a few. Access to the information contained in the database may also be granted to the customer to assist the customer in making subsequent orders, such as, for example, to re-order items previously ordered. For example, upon connecting to the ordering system, the customer may be presented with a list of items which the customer has purchased from the vendor in the past, the information contained in this list being compiled by the ordering system from addressable records stored in the database, wherein each record relates to a previous purchase made by the customer.

Although such systems oftentimes permit a customer to browse though the database to view the records contained therein relating to items purchased or ordered by the customer, it is typical for customers also to desire from time to time to print a written report of such information. However, obtaining such information from the customer's records in the database, using only the customer's browser, heretofore has been cumbersome, and oftentimes requires the customer to print each record individually and to copy (and/or cut-and-paste) the information contained in each record into a word processing program for later arranging by the customer into a presentable layout. It is therefore desirable to provide a method of delivering a formatted document over a communications network, wherein a conventional browser program may be used to request, view and receive the document. It is also desirable to provide a method of delivering a formatted document over a communications network, wherein the document is automatedly arranged into a pre-determined layout and formatted into a pre-selected file format upon request.

It has been observed that most vendors' customers prefer that a written report for a given purpose, such as, to itemize the customer's purchase history, contains substantially the same information, such as, for example, the item sold, the cost-per-unit of each item, the quantity of such items purchased in the preceding month and the quantity of such items currently pending to be shipped as a result of previously orders, regardless of the particular customer's business. Although the precise information contained in the report may vary slightly for each of a vendor's customers to meet each customer's specific needs, most reports for a particular purpose are substantially the same regardless of the customer requesting the report and the information contained in such standardizable reports can be arranged in a typical layout. It is therefore desirable to provide a method of delivering a formatted document over a communications network, wherein the information contained in the document is arranged in one of a plurality of pre-arranged layouts, and wherein one of the pre-arranged layouts may be selected for viewing using a conventional browser program.

Moreover, with the increasingly wide-spread use of electronic mail ("e-mail") as a medium of distributing information both to persons within an organization and to persons outside of the organization, customers often desire to distribute an electronic version of a document, such as a purchase history report, rather than a paper copy of the document, using e-mail. In such cases, customers desire that the recipients of the electronic documents be restricted from changing, modifying, adding to, or otherwise altering the contents of the document. An electronic document file converted into the portable document file format (".pdf"), such as with the Adobe Acrobat program available from Adobe Systems Incorporated, can be easily distributed as an attachment to an e-mail message and viewed using the Adobe Acrobat Reader program, also available from Adobe Systems Incorporated of San Jose, Calif. Unlike Adobe Acrobat, which allows a non-.pdf-formatted document file to be converted into the .pdf file format, Adobe Acrobat Reader allows only viewing of the .pdf-formatted document file. It is therefore desirable to provide a method of delivering a formatted document over a communications network, wherein the document is arranged into a pre-determined layout and then converted into the .pdf file format prior to delivery.

However, most database programs, including the Microsoft Access program available from Microsoft Corporation of Redmond, Wash., cannot inherently store the output of a report or other electronic database document, such as a document listing the results of a database query, as a file formatted in the .pdf file format. Rather, either Acrobat Distiller or PDFWriter, two independently-executable components of Adobe Acrobat, must be executed by the database program to store the report as a .pdf-formatted file. Accordingly, when the database is connected to an ordering system accessible by several customers simultaneously, such as the typical ordering system described above, each request by one of the several customers to store the output of a report, for example, of the customer's purchase history, as a .pdf-formatted file executes a new instance of either Acrobat Distiller or PDFWriter. Where several customers are simultaneously requesting that their own report be created in the .pdf file format, either or both the vendor's web server computer or database server computer will execute several instances of either or any Adobe Acrobat, Acrobat Distiller or PDFWriter, thereby seriously depleting the system resources of the vendor's computers. It is therefore desirable to provide a method of delivering a formatted document over a communications network, wherein a program used by a web server computer connected to the network also formats the document into a pre-selected file format, such as the .pdf file format.

Various methods of delivering electronic documents over a communications network have been provided in the prior art. For example, U.S. Pat. No. 5,502,637 to Beaulieu, et al. teaches a system by which brokers store .pdf-formatted report files onto a host database for viewing and printing by individual institutions, and U.S. Pat. No. 5,802,518 to Karaev, et al. teaches an information delivery system whereby user computers can view and print a .pdf-formatted report stored electronically onto a server computer. Despite these prior efforts, however, there remains a need for a method of delivering a formatted document over a communications network, such as the internet, wherein information contained in the document is arranged into a pre-determined layout, and wherein a program used by a web server computer connected to the network also formats the document into a pre-selected file format, such as the .pdf file format upon request.

SUMMARY OF THE INVENTION

The present invention is for a method of delivering formatted electronic documents over a communications network, such as the internet. A server computer is connected to a client computer via the internet and is in data communication with a data source having information stored thereon in the form of individually-addressable records. The client computer submits a request for the document by selecting a hypertext link pointing to a scripted template file containing script commands for instructing the server computer during preparation and formatting of the requested document. The server computer prepares the formatted document by extracting information from the data source and by arranging the information into one of a plurality of pre-selected layouts. The output is saved in the portable document file format and sent to the client computer, either as an attachment to an e-mail, as an image embedded in an .html-formatted document sent to the client computer and viewed by a browser program operating on the client computer, or as a hypertext link pointing to the location of the document on the server computer. Because the process of arranging the information in the document and of formatting the document into the portable document file format is driven by the scripted template file, the server computer is not required to run additional programs or components to perform these tasks.

According to one aspect of the present invention, a method of delivering a formatted document over a communications network is provided, comprising the steps of: providing a client computer connected to the network, the client computer having a browser program operating thereon; providing a server computer connected to the network such that the client computer is in data communication with the server computer, the server computer having an information server program operating thereon; providing a template file in data communication with the information server program of the server computer, the template file including a programming script; initiating the programming script to create the document having information of a pre-selected category arranged thereon according to a pre-determined layout thereof; receiving the information from a data source; arranging the information on the document according to the pre-determined layout; formatting the document having the information arranged thereon according to the predetermined pattern in a pre-selected file format; and, delivering the document in the pre-selected file format to the client computer via the network.

It is an object of the present invention to provide a method of delivering a formatted document over a communications network, wherein a conventional browser program may be used to request, view and receive the document.

It is another object of the present invention to provide a method of delivering a formatted document over a communications network, wherein the document is automatedly arranged into a pre-determined layout and formatted into a pre-selected file format upon request.

It is still another object of the present invention to provide a method of delivering a formatted document over a communications network, wherein the information contained in the document is arranged in one of a plurality of pre-arranged layouts, and wherein one of the pre-arranged layouts may be selected for viewing using a conventional browser program.

It is yet another object of the present invention to provide a method of delivering a formatted document over a communications network, wherein the document is arranged into a pre-determined layout and then converted into the conventional .pdf file format prior to delivery.

It is still another object of the present invention to provide a method of delivering a formatted document over a communications network, wherein a program used by a web server computer connected to the network formats the document into a pre-selected file format, such as the conventional .pdf file format.

These and additional objects, features and advantages of the present invention will become apparent to those reasonably skilled in the art from the description which follows, and may be realized by means of the instrumentalities and combinations particularly pointed out in the claims appended hereto.

BRIEF DESCRIPTION OF THE DRAWINGS

A better understanding of the present invention will be had upon reference to the following description in conjunction with the accompanying drawings in which like reference numerals represent like parts, and wherein.

DETAILED DESCRIPTION OF THE PREFERRED EMBODIMENTS

Figure 1:
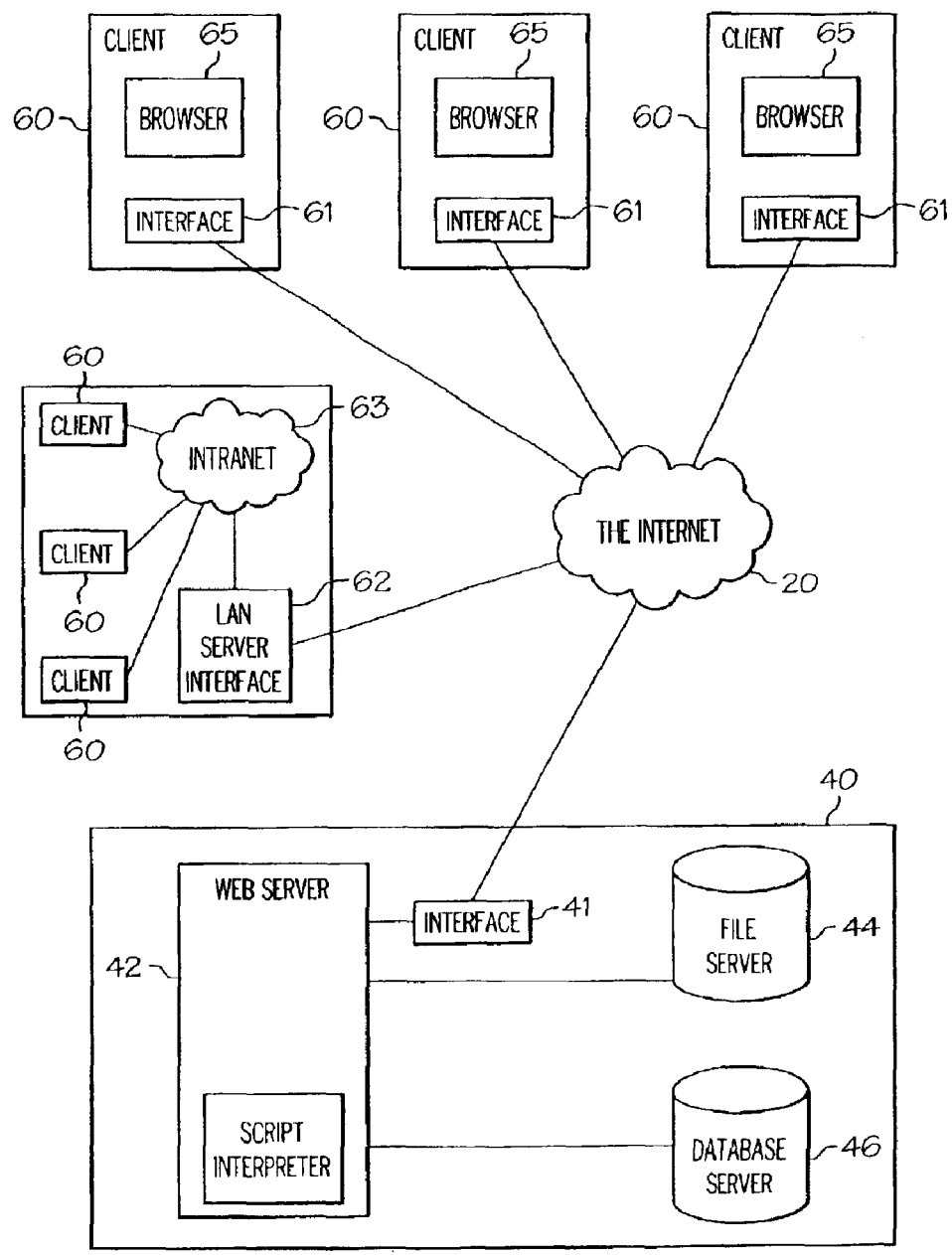
FIG. 1 is a diagrammatic representation of a system providing a method of delivering formatted documents over a communications network according to the preferred embodiment of the present invention, showing a plurality of client computers connected to a web site via the internet.

With reference to FIG. 1, a system providing a method of delivering a formatted electronic document over a communications network, such as, for example, the internet 20, according to a preferred embodiment of the present invention includes a vendor website 40 connected to the internet 20 by an interface 41 adapted to permit data communication between the website 40 and the internet 20 using any conventional network protocol, such as the TCP/IP protocol. The system also includes one or more client computers or workstations 60, each connected to the internet 20 by an interface 61 adapted to permit data communication between the computer or workstations 60 and the internet 20 using any conventional network protocol, such as the aforementioned TCP/IP protocol. Client computers 60 may be connected directly to the internet 20, such as by a direct dial-in connection to an internet service provider (not shown), or each may be one workstation of many workstations connected to one another in a conventional local area network ("LAN") intranet 63 topology, wherein a LAN server computer 62 is connected directly to the intranet 63 and is also connected directly to the internet 20 by an interface (not shown), in which case, client workstations 60 are connected to the internet 20 through the LAN server computer 62. Each client computer 60 includes a browser program 65, such as Microsoft Internet Explorer available from Microsoft Corporation of Redmond, Wash., running thereon and adapted to request, receive and display electronic documents formatted in hypertext mark-up language (".html") using the conventional hypertext transfer protocol ("http"). The browser 65 permits a user operating the client computer 60 to browse (or view items provided on) the internet 20, and particularly, provided on the world wide web ("www") portion of the internet 20, to request, receive and view .html-formatted documents residing on various server computers connect to the internet 20. Because each client computer 60 is substantially identical in construction and configuration, description of the present invention will be limited herein for the purpose of clarity to a description of only one client computer 60, and such description shall apply equally to any client computer 60 operating as described herein.

The website 40 includes an addressable web server 42 having a unique uniform resource locator ("URL") address which may be addressed by the browser 65 of the client computer 60 to permit connection and data exchange therebetween. The web server 42 is preferably a program, such as Microsoft Internet Information Server ("MSIIS") available from Microsoft Corporation, which permits the website 40 to share its resources, such as a file server 44 containing .html-formatted documents thereon or a database server 46 containing database records thereon, with client computers 60 connected to the website 40 via the internet 20. More particularly, MSIIS is a preferred web server program 42 because it includes a component known in the art as Active Server Pages ("ASP"), the use of which for the purposes hereof shall be described in greater detail hereinbelow.

Figure 2:
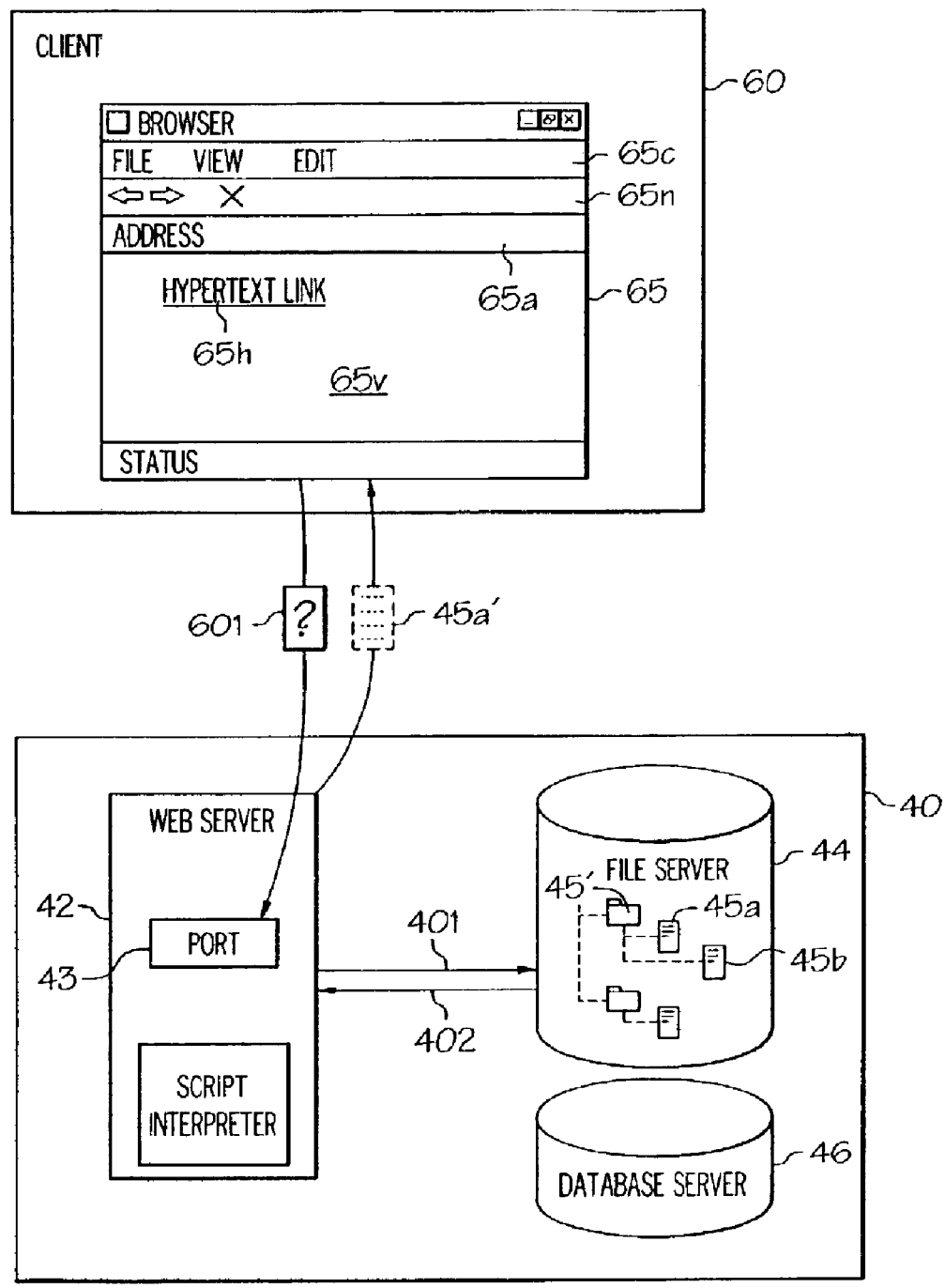
FIG. 2 is a diagrammatic representation of the system of FIG. 1, showing only one client computer connected to the web site and requesting an .html-formatted document therefrom.

With additional reference to FIG. 2, browser 65 includes a command line 65c and a navigation bar 65n which permit browsing of the internet 20, and particularly, viewing of .html-formatted documents shared by server computers connected to the internet 20 in a viewing area 65v of the browser 65. The layout and function of the browser 65 are known to those skilled in the art and the present invention shall not be limited to the particular features of the browser 65 described herein. Rather, the present invention contemplates use of any browser program which permits browsing and viewing of .html-formatted documents accessible via the internet 20.

The file server 44 preferably is a data storage and retrieval device, such as a high-capacity hard drive, having one or more files 45a, such as .html-formatted document files, arranged in a directory structure consisting of one or more folders 45'. Web server 42 is in data communication with the file server 44 and permits access to the files 45a stored thereon for remote viewing by customers, such as with browser 65. Web server 42 and file server 44 may be one in the same device, in which case, operational files used by the web server 42 may be segregated from the data files stored in the file server 44 in a separate partition or directory structure thereof. Alternatively, web server 42 and file server 44 may be separate storage devices, in which case, data is exchanged therebetween using known networking techniques.

Web server 42 includes a port 43 connected directly to the internet 20, through interface 41, to detect in-coming requests for access to the resources 44, 46 shared by the website 40. For example, when a customer wishes to view the document 45a with the customer's browser 65, the customer will "point" his browser 65 to the location on the file server 44 where the document 45a resides, such as, for example, by entering the unique URL associated with the document 45a in an address bar 65a of the browser 65 or by selecting ("clicking") on a hypertext link 65h provided in the viewing area 65v of the browser 65. Regardless of the manner in which the browser 65 is pointed to the document 45a, pointing the browser 65 to the document 45a sends a request 601 to the web server 42, requesting that the web server 42 respond to the request 601 by sending a copy of the .html-formatted document 45a back to the customer's browser 65. The URL or location of the browser 65 on the internet 20 is disclosed to the web server 42 in the request message 601. If the browser 65 is authorized to view the document 45a, web server 42 first accesses the document 45a (the step of accessing the document 45a being shown in the Figures as step 401), retrieves a copy 45a' of the document 45a (the step of retrieving a copy of the document 45a being shown in the Figures as step 402), and sends the copy 45a' of the document 45a to the browser 65, which displays the copy 45a' of the document 45a in the viewing area 65v. If document 45a contains only .html-formatted text and images, web server 42 takes no action with respect to the document 45a except to send the copy 45a' of it to the requesting browser 65. Of course, document 45a may contain hypertext links 65h to other .html-formatted documents, such as document 45b, also residing on the file server 44, or may contain hypertext links 65h to other .html-formatted documents residing on other servers located on the internet 20.

Figure 3:
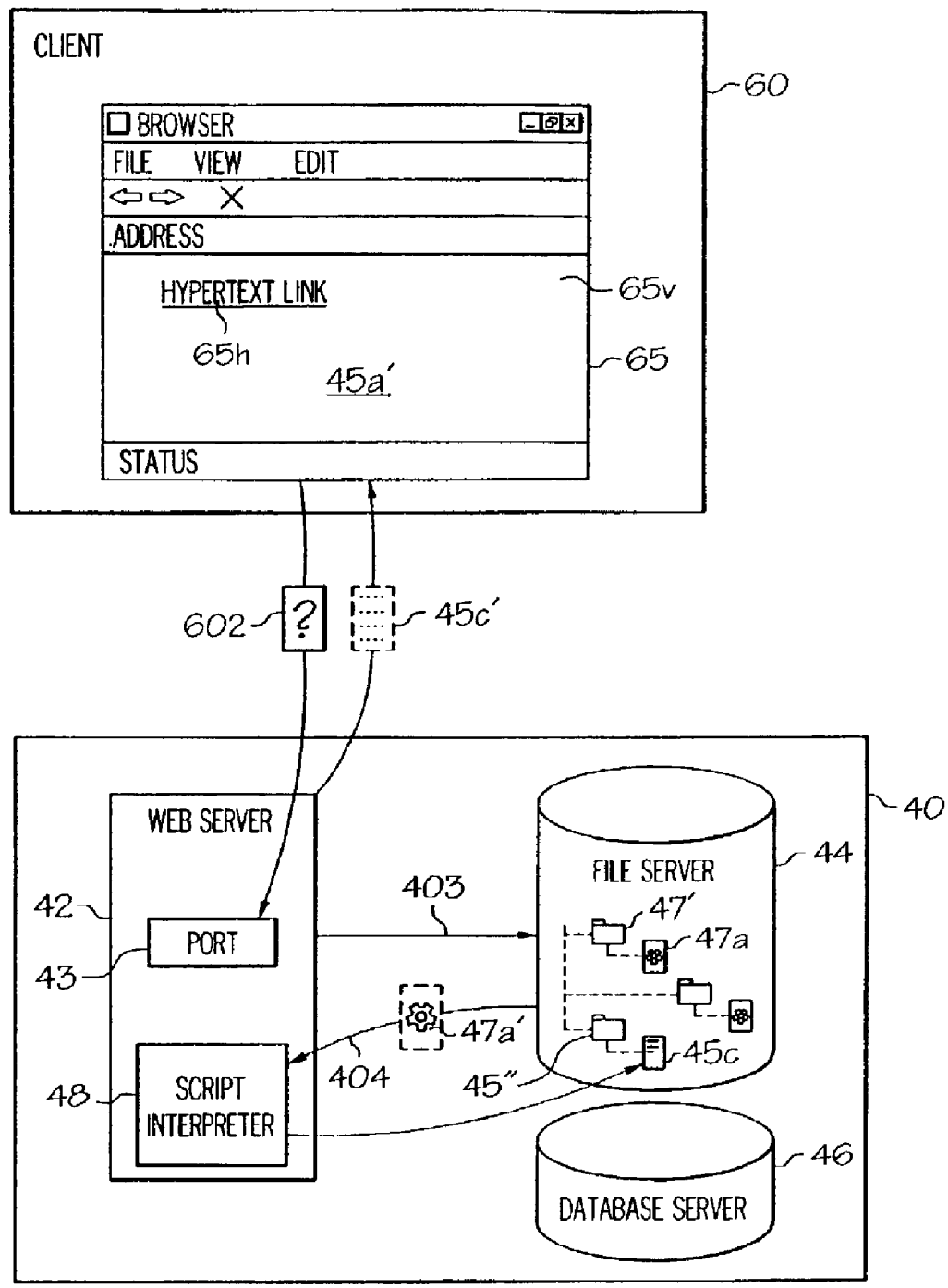
FIG. 3 is a diagrammatic representation of the system of FIG. 1, showing only one client computer connected to the web site and requesting a scripted file therefrom.

With additional reference to FIG. 3, the copy 45a' of document 45a is shown in the viewing area 65v of the browser 65 and may include a second hypertext link 65h', for example, to a scripted template file 47a residing within a folder 47' of the directory structure of file server 44. When the hypertext link 65h' to file 47a is selected, the browser 65 sends a request 602 to the web server 42, requesting access to the file 47a. Whereas .html-formatted document 45a comprises only pre-formatted text and images, the ASP component of MSIIS permits the scripted template file 47a to include script instructions, for example, written in Microsoft Visual Basic ("VB") available from Microsoft Corporation, in addition to pre-formatted text and images provided by conventionally static .html-formatted documents, such as document 45a. Web server 42 distinguishes .html-formatted document 45a from scripted template file 47a by a file extension attached to the filename of the respective file. For example, an .html-formatted document, such as document 45a, includes the file extension ".htm" or ".html" such that, when web server 42 receives a request 601 from a browser 65 to access an .html-formatted document, such as document 45a, having either an .htm or an .html file extension, the web server 42 merely retrieves the document 45a and sends a copy 45a' of the document 45a to the requesting browser 65.

Web server 42 identifies scripted .asp-formatted files, such as scripted template file 47a, by an ".asp" file extension attached to the filename. When web server 42 receives a request 602 from the browser 65 to access a scripted file, such as scripted file 47a, having an asp file extension, the web server 42 first accesses the file 47a (the step of accessing the file 47a being shown in the Figures as step 403), then retrieves a copy 47a' of the file 47a into a script interpreter 48 (the step of retrieving a copy 47a' of the file 47a being shown in the Figures as step 404), which scans the copy 47a' of the file 47a and executes any script commands found therein. The script interpreter 48 is inherent in ASP and in MSIIS, which provides ASP. While the script interpreter is executing any script commands found in the copy 47a' of the scripted file 47a, any output therefrom, including any static .html-formatted text or images contained within the file 47a, is temporarily stored in a folder 45" on the file server 44, for example, as a new .html-formatted document 45c. Once the script interpreter 48 has executed all script commands found in the scripted file 47a, the web server 42 sends a copy 45c' of the .html-formatted output file 45c created during the scripting process to the browser 65, which displays the copy 45c' of the output document 45c in the viewing area 65v thereof as though the browser 65 had actually requested an .html-formatted document in the first place. Because the .html-formatted document 45c is different from the .asp-formatted document 47a requested by the browser 65 (specifically, the .html-formatted document 45c does not include the scripting instructions found in the asp-formatted document 47a), .asp-formatted documents are also referred-to herein as "template" files. Moreover, since all scripting commands are executed by the web server 42, and more particularly, by the script interpreter 48 residing on the web server 42, the browser 65 is not notified of any scripting processes which have taken place. Once the copy 45c' of the output file 45c has been sent to the browser 65, the web server 42 may delete the output file 45c from the file server 44, if desired. Alternatively, web server 42 may send a referring link to the browser 65, such as in the form of a hypertext link pointed to output file 45c, in which case, the customer's selecting the link initiates transfer of the copy 45c' of the file 45c using, for example, the conventional file transfer protocol ("ftp").

Figure 4:
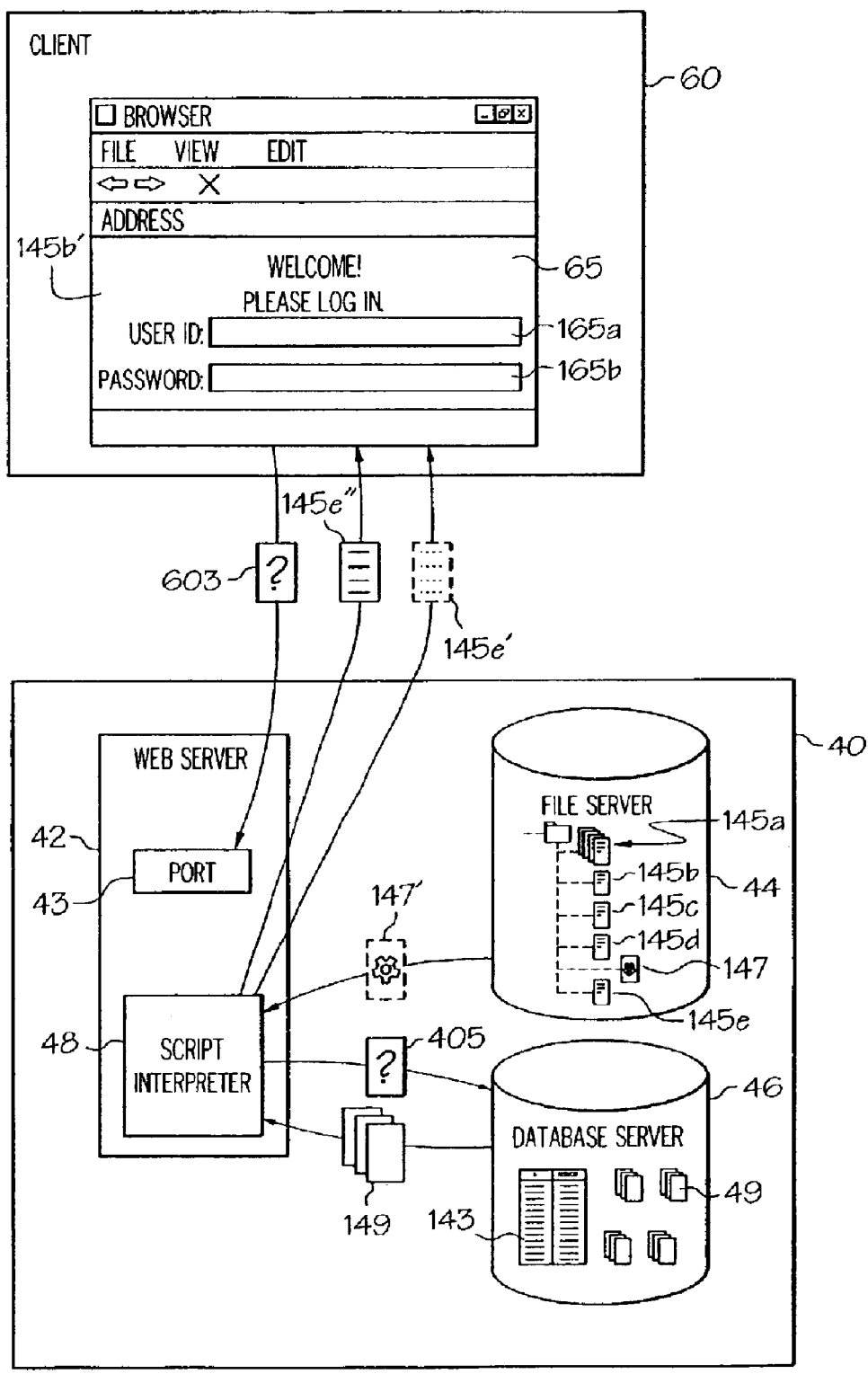
FIG. 4 is a diagrammatic representation of the system of FIG. 1, showing only one client computer connected to the web site and showing a preferred embodiment of creating a formatted file.

With additional reference to FIG. 4, the present invention utilizes scripted asp files to retrieve information from the database server 46, to arrange the information into one of a plurality of pre-selected report layouts and to store the output therefrom as a report file formatted, preferably, in the .pdf file format. Web server 42 is operated by a vendor, for example, a manufacturer/distributor of printed products, such as business forms, pre-printed labels or the like, and includes a unique URL providing an addressable location on the internet 20 with which customers may connect using a client computer 60 connected to the internet 20 as described hereinabove. In the present example, web server 42 operates as a gateway between an on-line ordering system residing on the vendor's website 40 and the customer's client computer 60, with which the customer may access the ordering system for the purpose of, for example, placing orders for the vendor's products directly with the vendor or retrieving formatted reports relating to the customer's ordering of products from the vendor.

Web server 42 is in data communication with the file server 44, which includes one or more .html-formatted documents stored thereon. For example, one or more .html-formatted documents 145a may provide pages of an on-line product catalogue which the customer may browse using the browser 65 and selecting the hypertext links provided in the documents 145a to view the documents 145a as described hereinabove. Preferably, however, file server 44 includes an .html-formatted document 145b providing an internet "home page" 145b' when viewed with the customer's browser 65, which welcomes the customer to the vendor's website 40 and which prompts the customer to enter a user ID and password in first and second text-entry boxes 165a, 165b, respectively. Information entered into text-entry boxes 165a, 165b is verified against a customer account list 143 stored in the database server 46 having the user ID's and passwords of all authorized users of the system. In the event the customer either enters a user ID which does exist in the customer account list 143 or enters a password which does not match the password associated with the user ID found in the customer account list 143, access to the remaining portions of the ordering system is denied.

Figure 5:
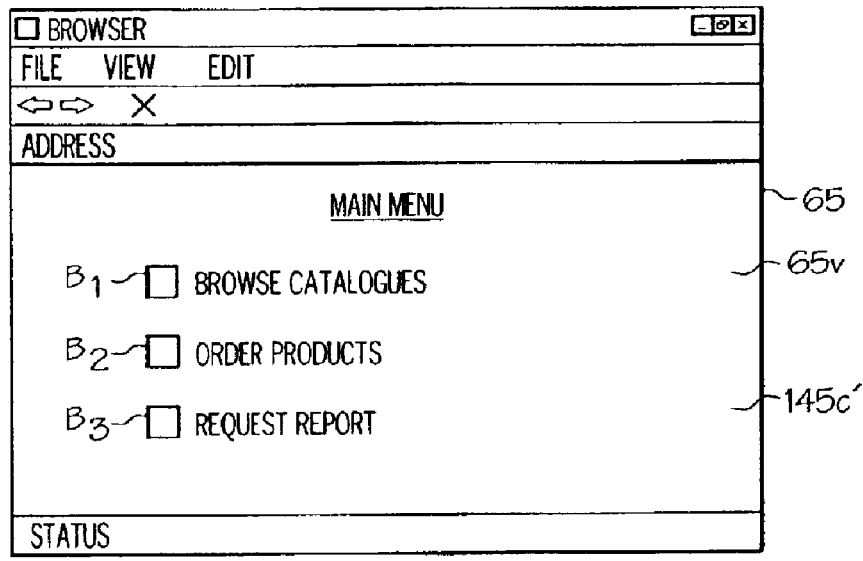
FIG. 5 is a diagrammatic representation of a "Main Menu" screen of the system of FIG. 1; and, FIG. 6 is a diagrammatic representation of a "Print Reports" screen of the system of FIG. 1.

With additional reference to FIG. 5, in response to the customer's successfully entering both a user ID existing in the customer account list 143 and the password associated with such user ID, the web server 42 sends a copy 145c' of an .html-formatted "Main Menu" document 145c to the customer's browser 65 providing one or more hypertext links, in the form of selectable buttons $B_1$, $B_2$, $B_3$ representing various tasks which the customer may perform upon selecting the respective button. That is, a first button $B_1$ may be provided, the customer's selection of which sends a request to the web server 42 to transmit back to the customer's browser 65 an .html-formatted document displaying a products catalogue for browsing by the customer; a second button $B_2$ may be provided, the customer's selection of which sends a request to the web server 42 to transmit back to the customer's browser 65 an .html-formatted template with which the customer may enter product information for ordering specific quantities of products from the vendor; and, a third button $B_3$ may be provided, the customers selection of which sends a request to the web server 42 to transmit back to the customer's browser 65 an .html-formatted check-list 166a, 166b (FIG. 6) with which the customer may retrieve a viewable/printable report of information relating to the customer's account, such as, for example, the customers purchase history or a list of any orders placed by the customer which are still pending, either awaiting shipping or in-transit. Neither the customer's browsing an on-line product catalogue nor the customer's submitting on-line orders form a part of the present invention, and as such, further discussion of these features will not be provided herein.

Database server 46 preferably includes a relational database written using a Structured Query Language ("SQL"), for operation with, for example, Microsoft SQL Server available from Microsoft Corporation, and includes one or more addressable records 49 relating to orders submitted by the vendor's customers. Searching the database and retrieving those records 49 which relate to a specific customer, then, if arranged into tabular form, may provide a viewable/printable report of the customer's purchase history.

Figure 6:
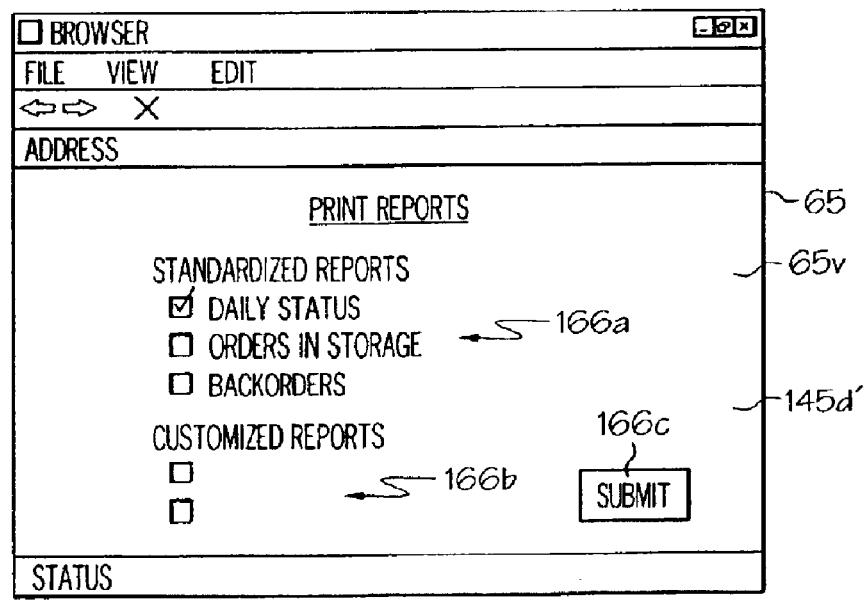

With additional reference to FIG. 6, in response to the customer's selecting the third button 83 of the "Main Menu" screen 145c', web server 42 retrieves a copy 145d' of an .html-formatted "Print Reports" document 145d from the file server 44 and sends the copy 145d' of the document 145d to the customer's browser 65 for viewing. Document 145d (and therefore, screen 145d') includes one or more selection check-boxes 166a, 166b for the customer's selecting between one or more pre-arranged standardized reports 166a, or alternatively, for the customer's selecting between one or more pre-arranged reports 166b customized for that particular customer. That is, check-boxes 166a relating to standardized reports are provided by document 145d regardless of which customer is accessing the screen 145d', whereas, screen 145d' may provide different check-boxes 166b for each customer, depending on whether the customer has requested that customized reports be made accessible to it.

Customer selects one of the check-boxes 166a, 166b and selects a button 166c to submit a request 603 to the web server 42. With reference now back to FIG. 4, the customer's selecting the button 166c sends the request 603 to the web server 42, requesting access to the report template corresponding to the check-box 166a, 166b which was selected by the user in screen 145d' (FIG. 6). For example, if the customer selected the check-box 166a corresponding to the standardized "Daily Status" report, selecting button 166c will send a request to the web server 42 for access to a report template file for creating a "Daily Status" report. Particularly, report templates are stored on the file server 44 as scripted .asp-formatted files, for example, template file 147 used to generate a "Daily Status' report, and as such, each template file includes an ".asp" filename extension which signals to the file server 42 that the browser 65 is requesting that the web server 42, and more particularly, the script interpreter 48 of the web server 42, process any scripting commands found in the template file 147 before responding to the request.

The web server 42, detecting that the browser 65 is requesting a template file 147 with an ".asp" file extension, retrieves a copy 147' of the template file 147 into the script interpreter 48 and begins executing any script commands found therein. In the present example, template file 147 is a scripted .asp-formatted file containing script instructions written using a scripting language, such as Microsoft Visual Basic ("VB") available from Microsoft Corporation. Preferably, the script contained within template file 147, after performing certain "housekeeping" operations, such as declaring variables or defining a header to be printed at the top of each page of the report generated thereby, submits a query 405 to the database, requesting information relating to the customer accessing the system, the identity of which is known to the web server 42 from the information supplied to the web server 42 in the log-on screen 145b' (FIG. 4). Database server 46 searches the records 49 for information matching the search query 405 submitted by the web server 42 and sends back data 149 to be arranged and formatted by the web server 42 according to further instructions from the script contained in the template file 147. Additional scripting instructions arrange the data into a pre-selected layout, such as in the form of a table, and send the output from the script directly to a .pdf-formatted file 145e created by the script and stored on the file server 44. A copy 145e' of the report file 145e is sent to the browser 65 for viewing thereby, such as with Adobe Acrobat Reader plug-in available from Adobe Systems Incorporated. Alternatively, scripting instructions contained in the template file 147 may create a referring html-formatted document 145e", which it sends to the browser 65 instead of the copy 145e of the .pdf-formatted document 145e, and which contains a hypertext link to the report document 145e stored on the file server 44. The customer's selecting the hypertext link, then, downloads a copy 145e' of the report document 145e from the file server 44 onto the local hard drive of the client computer 60 for storage and later viewing using the aforementioned Adobe Acrobat Reader program.

The above-described system and method utilize a scripting language, preferably VB running in an ASP environment on an MSIIS web server, to retrieve requested data from a SQL server, to arrange the data into a pre-selected layout and to store output therefrom as a .pdf-formatted file for viewing or downloading by the customer. Because these steps are performed as instructions in an .asp-formatted document, they are processed by the script interpreter, and as such, a separate application, such as Acrobat Distiller or PDFWriter, is not required to convert the output from the script into the .pdf file format. Web server resources, then, are significantly preserved, thereby permitting multiple customers to request .pdf-formatted reports without unreasonably depleting web server system resources. Alternatively, a common gateway interface ("CGI") script, particularly suitable for UNIX-type operating environments, may be used in place of the ASP script of the preferred embodiment.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Modifications are contemplated which can be made without departing from either the spirit or the scope of the present invention. For example, although certain documents have been described herein as .html-formatted documents, it is understood that an asp-formatted document, if void of any scripting commands, will send the same .html-formatted document to a browser as it would if the requested document was an .html-formatted document having an .htm or an .html file extension. Accordingly, any .html-formatted document described herein can be formatted as an asp-formatted document without departing from either the spirit or the scope of the present invention.

A preferred asp-formatted script is reproduced below for illustrative purposes, the operation of which will be apparent to those skilled in the art.

```
<%Option Explicit%>
<!-- #include file="ReportingFunctions.inc" -->
<%Dim objFileSystem
Dim fPDF
Dim rptTitle
Dim FileName
Dim ObjectNumber
Dim Offset
Dim PageNumber
Dim objPagesRoot
Dim arNodes
Dim arContents( )
Dim arOffsets( )
Dim arPages( )
Dim arFonts( )
Function FormatHeader(CRDate)
Dim TmpStr
Dim DateStr
Dim Y
If IsDate(CRDate) Then
DateStr = "As of:" & Right("0" & DatePart("m", CRDate), 2) & "/" &
Right("0" & DatePart("d", CRDate), 2) &
"/" & DatePart("yyyy", CRDate)
End If
Y = CInt(756 − Len(DateStr) * 6)
TmpStr = "/CB 14 Tf" & vbCrLf
TmpStr = TmpStr & "36 576 Td (Daily Status) Tj" & vbCrLf
TmpStr = TmpStr & "/CB 10 Tf" & vbCrLf
TmpStr = TmpStr & "1 0 0 1" & Y & "576 Tm (" & DateStr & ") Tj" &
vbCrLf
TmpStr = TmpStr & "36 570 m" & vbCrLf & "756 570 l" & vbCrLf &
"S" & vbCrLf
TmpStr = TmpStr & "36 572 m" & vbCrLf & "756 572 l" & vbCrLf &
"S" & vbCrLf
TmpStr = TmpStr & "/CN 9 Tf" & vbCrLf
TmpStr = TmpStr & "1 0 0 1 36 561 Tm (          -------------- Per Each
-----------------     )Tj" & vbCrLf
TmpStr = TmpStr & "1 0 0 1 36 553 Tm (Product ID
    Ship Qty      Smoothed Previous
12   In   On   In   Months Ind. Global Flag) Tj" & vbCrLf
TmpStr = TmpStr & "1 0 0 1 36 545 Tm (Product Description
Ply U/I Per U/I M-T-D Usage  Usage
Months Usage   Storage   Order   Staging Supply Code
Product Type) Tj" & vbCrLf
TmpStr = TmpStr & "36 542 m" & vbCrLf & "756 542 l" & vbCrLf &
"S" & vbCrLf
FormatHeader = TmpStr & "36 540 m" & vbCrLf & "756 540 l" &
vbCrLf & "S" & vbCrLf
End Function
Function FormatFooter
Dim TmpStr
Dim PageStr
TmpStr = "36 36 m" & vbCrLf & "756 36 l" & vbCrLf & "S" & vbCrLf
TmpStr = TmpStr & "36 38 m" & vbCrLf & "756 38 l" & vbCrLf &
"S" & vbCrLf
TmpStr = TmpStr & "/CB 8 Tf" & vbCrLf
TmpStr = TmpStr & "1 0 0 1 36 28 Tm (+ Ind.Avg.Usage > 120%,
* Ind.Avg.Usage < 80%) Tj" & vbCrLf
PageStr = "Page:" & Right(" " & PageNumber, 4)
FormatFooter = TmpStr & "1 0 0 1" & CInt(756 − Len(PageStr) * 4.8)
&
" 28 Tm (" & PageStr & ") Tj" & vbCrLf
End Function
Function MonthlyUsagePercentIndicator(rsinfo)
Dim work_usage_pct
Dim curr_mo_usage_qty
Dim avg_mo_usage_qty
work_usage_pct = 0
curr_mo_usage_qty = rsinfo("CurrentMonthUsageQuantity")
avg_mo_usage_qty = rsinfo("ActualAverageMonthlyUsage")
If curr_mo_usage_qty = 0 And avg_mo_usage_qty = 0 Then
work_usage_pct = 100
ElseIf avg_mo_usage_qty = 0 Then
work_usage_pct = 9999
MonthlyUsagePercentIndicator = "*"
Else
work_usage_pct = (curr_mo_usage_qty /
avg_mo_usage_qty) * 100
End If
If work_usage_pct > 120 Then
MonthlyUsagePercentIndicator = "+"
ElseIf work_usage_pct < 80 Then
MonthlyUsagePercentIndicator = "*"
Else
MonthlyUsagePercentIndicator = " "
End If
End Function
Function MonthSupply(rsinfo)
MonthSupply = (rsinfo("QuantityInStorage") +
rsinfo("QuantityOnOrder") +
rsinfo("QuantityInStaging"))/(rsinfo("SmoothedAverageMonthlyUsage") +
0.0001)
End Function
Sub GenerateReport(PDFFile)
Dim i, j, X, Y, K, M, TmpI, TmpJ
Dim Conn
Dim SQL
Dim TmpStr, CRDate
Dim rsInfo
Dim LineCount
Dim YCoord
Dim MaxLeafNodes
Dim TotalsWritten
Set Conn = Server.CreateObject("ADODB.Connection")
Server.ScriptTimeout = 600
Conn.Open "MultiVendor"
CRDate = " "
SQL = "Select Distinct CreateDate From DownloadProduct
Where ControlCustomerNumber = " &
Session("CCNumber") & " Order By CreateDate Desc"
Set rsInfo = Conn.Execute(SQL)
If Not rsInfo.EOF Then
CRDate = rsInfo("CreateDate")
End If
SQL = "sp_DailyStatus" & Session("CCNumber")
Set rsInfo = Conn.Execute(SQL)
If rsInfo.EOF Then
arPages(UBound(arPages)) = ObjectNumber
ObjectNumber = ObjectNumber + 1
arContents(UBound(arContents)) = ObjectNumber
ObjectNumber = ObjectNumber + 1
TmpStr = FormatHeader(CRDate)
TmpStr = TmpStr & "1 0 0 1 36 525 Tm (** No data to print for this
report request **) Tj" & vbCrLf
TmpStr = TmpStr & FormatFooter
Call CreateContentsObject(fPDF, TmpStr,
arContents(UBound(arContents)))
Call CreatePageObject(fPDF, UBound(arPages), objPagesRoot, 0)
ReDim Preserve arPages(UBound(arPages) + 1)
ReDim Preserve arContents(UBound(arContents) + 1)
rsInfo.Close
Set rsInfo = Nothing
Conn.Close
Set Conn = Nothing
Exit Sub
Else
```

-continued

```
While Not rsInfo.EOF
arPages(UBound(arPages)) = ObjectNumber
ObjectNumber = ObjectNumber + 1
arContents(UBound(arContents)) = ObjectNumber
ObjectNumber = ObjectNumber + 1
LineCount = 0
YCoord = 525
TmpStr = FormatHeader(CRDate)
TmpStr = TmpStr & "/CN 9 Tf" & vbCrLf
While Not rsInfo.EOF AND LineCount < 19
TmpStr = TmpStr & "1 0 0 1 36" & YCoord & "Tm (" &
EscapeString(Left(rsInfo("ProductID") & String(25, " "), 25)) & " "
TmpStr = TmpStr & String(98, " ") & " "
TmpStr = TmpStr & EscapeString(Left(rsInfo("GlobalProductFlag") &
String(2, " "), 2)) & " "
TmpStr = TmpStr & ") Tj" & vbCrLf
YCoord = YCoord - 10
TmpStr = TmpStr & "1 0 0 1 36 " & YCoord & "Tm (" &
EscapeString(Left(rsInfo("ProductName") &
String(25," "), 25)) & " "
TmpStr = TmpStr & EscapeString(Right(String(3, " ") & rsInfo("Ply"),
3)) & " "
TmpStr = TmpStr & EscapeString(Right(String(4, " ") &
rsInfo("ShippingUnitofIssue"), 4)) & " "
TmpStr = TmpStr & EscapeString(Right(String(7, " ") &
rsInfo("ShippingUnitofIssueQuantity"), 7)) & " "
TmpStr = TmpStr & EscapeString(Right(String(12, " ") &
rsInfo("CurrentMonthUsageQuantity"), 12)) &
MonthlyUsagePercentIndicator(rsinfo)
TmpStr = TmpStr & EscapeString(Right(String(9, " ") &
rsInfo("SmoothedAverageMonthlyUsage"), 9)) & " "
TmpStr = TmpStr & EscapeString(Right(String(12, " ") &
rsInfo("Previous12MonthUsageQuantity"), 12)) & " "
TmpStr = TmpStr & EscapeString(Right(String(10, " ") &
rsInfo("QuantityinStorage"), 10)) & " "
TmpStr = TmpStr & EscapeString(Right(String(9, " ") &
rsInfo("QuantityonOrder"), 9)) & " "
TmpStr = TmpStr & EscapeString(Right(String(8, " ") &
rsInfo("QuantityinStaging"), 8)) & " "
TmpStr = TmpStr & Right(" " & FormatNumber(MonthSupply(rsInfo),
1), 6) & " "
TmpStr = TmpStr & EscapeString(Right(String(4, " ") &
rsInfo("IndicatorCode"), 4)) & "  "
TmpStr = TmpStr & EscapeString(Left(rsInfo("ProductType") &
String(2, " "), 2))
TmpStr = TmpStr & ") Tj" & vbCrLf
YCoord = YCoord - 15
LineCount = LineCount + 1
rsInfo.MoveNext
Wend
TmpStr = TmpStr & FormatFooter
Call CreateContentsObject(fPDF, TmpStr,
arContents(UBound(arContents)))
PageNumber = PageNumber + 1
ReDim Preserve arPages(UBound(arPages) + 1)
ReDim Preserve arContents(UBound(arContents) + 1)
Wend
rsInfo.Close
Set rsInfo = Nothing
Conn.Close
Set Conn = Nothing
End If
End Sub
PageNumber = 1
ObjectNumber = 1
Offset = 0
ReDim arOffsets(1, 0)
ReDim arFonts(1, 0)
ReDim arContents(0)
ReDim arPages(0)
FileName = Session("UserID") & Hour(Now) & Minute(Now) &
Second(Now) & ".PDF"
Set objFileSystem = CreateObject("Scripting.FileSystemObject")
Set fPDF =
objFileSystem.CreateTextFile("E:\SMARTworks\Tmp\Reports\" &
FileName, True)
Call Initialize
Call WritePDFHeader(fPDF)
rptTitle = "Daily Status"
Call WriteInfoObject(fPDF, rptTitle)
Call WriteCatalogObject(fPDF)
Call WriteOutlinesObject(fPDF)
Call WriteProcSetObject(fPDF, "[/PDF /Text]")
Call IncludeCourier(fPDF)
Call IncludeCourierBold(fPDF)
Call GenerateReport(fPDF)
Call WritePageObjects(fPDF)
Call WritePagesRootObject(fPDF, "Landscape", -1)
Call WriteXREFHeader(fPDF)
Call WriteXREFBody(fPDF)
Call WritePDFTrailer(fPDF)
fPDF.Close%>
<HTML>
<HEAD><TITLE>Reports: FormPac - Daily Status</TITLE>
<LINK REL="stylesheet" HREF="styles.css" TYPE="text/css">
</HEAD>
<BODY BGCOLOR="#FFCC99" TEXT="#003366"
LINK="#0000FF" ALINK="#0000FF"
VLINK="#0000FF" >
<BASEFONT SIZE="2"> <FONT COLOR="#000000" FACE="Verdana,
Times Roman">
<p> <FONT COLOR="#003366" SIZE="+3" FACE="Verdana,
Times Roman"> <DIV class=big>Reports:
FormPac - Daily Status</FONT> </DIV> </p>
<p> <FONT SIZE="+1" COLOR="#003366" FACE="Verdana,
Times Roman"> <DIV class=medium>Your
report request has been processed successfully.</p>
<p>You may<A HREF="<%= "/Reports/" & FileName %>"
TARGET="_top"> view the report now</A> or
download the report for viewing at a later time.</p>
<P>To download the report, right click on the above link then choose
"Save Link As" option.
<p>To view the report, you need to install Adobe's®
Acrobat® Reader.</p>
<P> <A HREF="http://www.adobe.com/prodindex/acrobat/readstep.html"
TARGET="_top"> <img
SRC="/images/getacro.gif" WIDTH="88" HEIGHT="31"
ALT="Get Acrobat Reader"
BORDER="0"> </A> </p>
```

I claim:

1. A method of delivering a formatted document over a communications network, comprising the steps of:

providing a first computer connected to said network;

providing a second computer connected to said network in data communication with said first computer, said second computer having a server program running thereon;

providing a template file accessible by said server program of said second computer, initiating a programming script associated with said template file to create a document having information of a pre-selected category arranged thereon according to a pre-determined layout thereof;

receiving said information from a data source;

arranging said information according to said pre-determined layout;

executing said script to format said information arranged according to said pre-determined layout in a pre-selected file format, wherein said pre-selected file format comprises a format other than hypertext markup language format; and delivering said document in said pre-selected file format to said first computer via said network.

2. The method of claim 1, wherein said step of receiving said information from said data source includes the steps of:

providing a database having data stored therein as addressable records thereof;

querying said database to derive said information; and sending said information to said second computer server program.

3. The method of claim 1, wherein said step of delivering said document to said first computer includes the steps of:
saving said document on said second computer;
providing a link to said document stored on said second computer, said link being displayed on said first computer; and
selecting said link to initiate said step of delivering said document to said first computer.

4. The method of claim 1 wherein said programming script initiates said steps of receiving said information from said data source, arranging said information on said document according to said predetermined layout and delivering said document to said first computer.

5. The method of claim 1, wherein said step of executing said script to format said document in said pre-selected file format includes the step of selecting a portable document file (PDF) format as said pre-selected file format.

6. The method of claim 1, wherein said step of providing a template file includes the step of assigning an "asp" filename extension to said template file.

7. The method of claim 1, wherein said step of initiating said template file includes the step of providing a script interpreter on said server program of said second computer.

8. The method of claim 7, wherein said script interpreter is Microsoft Active Server Pages.

9. The method of claim 1, wherein said server program is Microsoft Internet Information Server.

10. The method of claim 1, wherein said first computer comprises a client computer and said second computer comprises a server computer.

11. The method of claim 1, wherein said second computer comprises a web server.

12. The method of claim 1, wherein said script comprises script commands contained within said template.

13. The method of claim 1, wherein said step of delivering said document to said first computer is selected from the group consisting of delivering said document via email, delivering said document embedded in an .html file sent to said first computer, delivering said document by providing a hyperlink pointing to the location of said document and electronically transferring said document to said first computer.

14. A method of electronically delivering a formatted document comprising the steps of:
providing a first computer connected a network;
providing a second computer connected to said network and in data communication with said first computer;
providing a template file accessible by said second computer
issuing a request from said first computer to said second computer to create a document, said document including information of a pre-selected category arranged according to a pre-determined layout based upon said template file;
querying a data source for said information of said pre-selected category;
organizing said information according to said pre-determined layout thereof;
executing a script to format said document into a file format other than hypertext markup language; and
delivering said document in said file format other than hypertext markup language to said first computer via said network.

15. The method of electronically delivering a formatted document according to claim 14, wherein said document is formatted into a portable document file (PDF) format.

16. The method of electronically delivering a formatted document according to claim 14, wherein said script is coded as part of an Active Server Page.

17. The method of electronically delivering a formatted document according to claim 14, wherein said script is coded as a Common Gateway Interface script.

18. The method of electronically delivering a formatted document according to claim 14, wherein delivering said document to said first computer comprises:
saving said document on said second computer;
providing a link to said document stored on said second computer to said first computer;
selecting said link to initiate said step of electronically transferring said document to said first computer; and
storing said document on said first computer.

19. The method of electronically delivering a formatted document according to claim 14, wherein said document is delivered to said first computer by attaching said document to an email and emailing said document to said first computer.

20. The method of electronically delivering a formatted document according to claim 14, wherein said document is delivered to said first computer by storing said document of said second computer, and allowing said first computer to transfer said document to said first computer using a file transfer protocol.

21. A method of creating and delivering customized documents, comprising the steps of:
providing a first computer connected to a network;
providing a second computer connected to said network such that said first computer is in data communication with said second computer;
issuing a request from said first computer to said second computer to create a document having information of a pre-selected category;
deriving said information from at least one data source based upon said request from said first computer;
providing a template file accessible by said second computer that defines a pre-determined layout of said document;
arranging said information according to said pre-determined layout defined by said template;
initiating a programming script to format said information arranged according to said pre-determined layout in a pre-selected file formal, wherein said pre-selected file format comprises a format other than hypertext markup language format; and
making said document in said pre-selected file format available to said first computer via said network.

22. The method according to claim 21, wherein said pre-selected file format comprises the portable document file (PDF) format.

23. The method of claim 22, wherein said document is made available to said first computer using an approach selected from the group consisting of delivering said document via email, delivering said document embedded in an .html file sent to said first computer, delivering said document by providing a hyperlink pointing to the location of said document and electronically transferring said document to said first computer.

24. The method of claim 21, wherein said programming script is integrated with said template file.

25. The method of claim 24, wherein said programming script further drives the step of arranging said information.

26. A method of creating and formatting electronic documents, comprising:

receiving a request for a customized electronic document;

extracting data from at least one data source that relates to desired information for said customized electronic document after receiving said request;

preparing and arranging said desired information in a pre-determined layout;

initiating a programming script to format said customized electronic document in a pre-selected file format, wherein said pre-selected file format comprises a format other than hypertext markup language; and storing said customized electronic document.

27. The method according to claim 26, wherein said programming script further comprises instructions for the preparation of said customized electronic document.

28. The method according to claim 26, wherein said pre-selected file format comprises the portable document file (PDF) format.

29. The method according to claim 26, wherein said pre-determined layout is defined by a template file.

30. The method according to claim 29, wherein said template file provides a plurality of pre-selected layouts from which said pre-determined layout may be selected.

31. The method according to claim 26, wherein said programming script is provided as part of a template file defining a scripted template file.

32. The method according to claim 31, wherein said preparing, arranging and formatting of said customized electronic document is driven by said scripted template file.

33. The method according to claim 32, wherein in said scripted template file comprises commands embedded into said template as an active server page.

34. A method of creating and formatting documents comprising:

issuing a request to create an electronic document having desired information based upon a pre-selected layout;

identifying a template file associated with said pre-selected layout;

querying at least one data source to derive said information;

creating said electronic document by arranging said information based upon said pre-selected layout; and executing a script to format said electronic document into a file format other than the hypertext markup language file format.

35. The method according to claim 34, wherein said information is arranged based upon said pre-selected layout by said script.

36. The method according to claim 34, wherein said electronic document is formatted into the portable document file (PDF) format.

37. The method according to claim 34, further comprising delivering the formatted electronic document to a user.

* * * * *

UNITED STATES PATENT AND TRADEMARK OFFICE
CERTIFICATE OF CORRECTION

PATENT NO. : 6,886,025 B1
DATED : April 26, 2005
INVENTOR(S) : Larry W. Britton

It is certified that error appears in the above-identified patent and that said Letters Patent is hereby corrected as shown below:

Column 7,
Line 51, "asp" should read -- .asp --.

Column 8,
Line 9, "asp-formatted" should read -- .asp-formatted --.
Line 24, "asp" should read -- .asp --.

Column 9,
Line 21, "customers" should read -- customer's --.

Column 10,
Line 1, ""Daily Status'" should read -- "Daily Status" --.

Column 11,
Lines 7, 13 and 15, "asp-formatted" should read -- .asp-formatted --.

Signed and Sealed this

Tenth Day of January, 2006

JON W. DUDAS
*Director of the United States Patent and Trademark Office*